United States Patent
Abe et al.

(10) Patent No.: US 8,653,952 B2
(45) Date of Patent: Feb. 18, 2014

(54) POWER LINE COMMUNICATION SYSTEM

(75) Inventors: Taiji Abe, Nishio (JP); Yuji Sugimoto, Kariya (JP); Akira Takahashi, Nisshin (JP)

(73) Assignees: DENSO CORPORATION, Kariya (JP); Nippon Soken, Inc., Nishio (JP)

( * ) Notice: Subject to any disclaimer, the term of this patent is extended or adjusted under 35 U.S.C. 154(b) by 352 days.

(21) Appl. No.: 13/029,164

(22) Filed: Feb. 17, 2011

(65) Prior Publication Data

US 2011/0205035 A1 Aug. 25, 2011

(30) Foreign Application Priority Data

Feb. 19, 2010 (JP) .................................. 2010-34651

(51) Int. Cl.
G08C 19/12 (2006.01)

(52) U.S. Cl.
USPC ...................... 340/13.23; 340/538; 340/12.32; 307/3

(58) Field of Classification Search
USPC ....................................... 340/13.23
See application file for complete search history.

(56) References Cited

U.S. PATENT DOCUMENTS

| 2001/0026195 A1 | 10/2001 | Tokumitsu et al. |
| 2010/0111201 A1* | 5/2010 | Sakai et al. ................ 375/257 |

FOREIGN PATENT DOCUMENTS

| JP | U-05-091045 | 12/1993 |
| JP | 2000298745 A | * 10/2000 |
| JP | A-2000-298745 | 10/2000 |

* cited by examiner

Primary Examiner — George Bugg
Assistant Examiner — Anthony D Afrifa-Kyei
(74) Attorney, Agent, or Firm — Posz Law Group, PLC

(57) ABSTRACT

A power line communication system includes a plurality of communication nodes, a communication line coupling the communication nodes, a direct current power line coupling a connection point of the communication line with one of a positive terminal of a battery and a supply terminal of a load, and a capacitor coupled between the direct current power line and a ground. The communication nodes communicate with each other by superimposing a high frequency signal having a wavelength of $\lambda$ to the communication line. The capacitor is coupled with the direct current power line at a position where a line length from the connection point is $(n\times\lambda/2+\lambda/4)$, where n is a natural number including zero.

8 Claims, 7 Drawing Sheets

POWER LINE COMMUNICATION SYSTEM

CROSS REFERENCE TO RELATED APPLICATIONS

The present application is based on and claims priority to Japanese Patent Application No. 2010-34651 filed on Feb. 19, 2010, the contents of which are incorporated in their entirety herein by reference.

BACKGROUND OF THE INVENTION

1. Field of the Invention

The present invention relates to a power line communication system in which a plurality of communication nodes communicates with each other using a power line.

2. Description of the Related Art

In a power line communication system disposed in a vehicle, a high frequency signal is superimposed to a power line coupled with an in-vehicle battery so that communication is performed between a plurality of nodes such as an electronic control unit (ECU) disposed at various parts. JP-A-2008-244701 (corresponding to US 2010/0111201 A) discloses a power line communication system that includes a balanced filter so as to keep a balanced state of a signal line coupled with a power line and to restrict a transmission of a high frequency signal to a battery.

However, in a case where a large current is supplied to a section where a power line communication is performed, a dimension of an element for forming the balanced filter needs to be large in accordance with the current. Thus, a space, a cost, and a weight may be increased.

SUMMARY OF THE INVENTION

In view of the foregoing problems, it is an object of the present invention to provide a power line communication system that can restrict influence of a high frequency signal to a section where power communication is not performed.

A power line communication system according to a first aspect of the present invention includes a plurality of communication nodes, a communication line coupling the communication nodes, a direct current power line coupling a connection point of the communication line with one of a positive terminal of a battery and a supply terminal of a load, and a capacitor coupled between the direct current power line and a ground. The communication nodes communicate with each other by superimposing a high frequency signal having a wavelength of $\lambda$ to the communication line. The capacitor is coupled with the direct current power line at a position where a line length from the connection point is $(n \times \lambda/2 + \lambda/4)$, where n is a natural number including zero.

In the power line communication system according to the first aspect, influence of the high frequency signal to the battery or the load can be restricted with a simple structure.

A power line communication system according to a second aspect of the present invention includes a plurality of communication nodes, a communication line coupling the communication nodes, and a direct current power line coupling the communication line with one of a positive terminal of a battery and a supply terminal of a load. The communication nodes communicate with each other by superimposing a high frequency signal having a wavelength of $\lambda$ to the communication line. The direct current power line has a line length of $(n \times \lambda/2 + \lambda/4)$, where n is a natural number including zero.

In the power line communication system according to the second aspect, influence of the high frequency signal to the battery or the load can be restricted with a simple structure.

A power line communication system according to a third aspect of the present invention includes a plurality of communication nodes, a communication line, a first direct current power line, a second direct current power line, a first capacitor, and a second capacitor. The communication line couples the communication nodes. The communication line is formed of a balanced line including a first communication line and a second communication line. The first direct current power line couples a first connection point of the first communication line with a positive terminal of a battery. The second direct current power line couples a second connection point of the second communication line with the positive terminal of the battery. The first capacitor is coupled between the first direct current power line and a ground. The second capacitor is coupled between the second direct current power line and the ground. The communication nodes communicate with each other by superimposing a high frequency signal having a wavelength of $\lambda$ to the communication line. The first capacitor is coupled with the first direct current power line at a position where a line length from the first connection point is $(n \times \lambda/2 + \lambda/4)$, where n is a natural number including zero. The second capacitor is coupled with the second direct current power line at a position where a line length from the second connection point is $(n \times \lambda/2 + \lambda/4)$.

In the power line communication system according to the third aspect, influence of the high frequency signal to the battery can be restricted with a simple structure.

A power line communication system according to a fourth aspect of the present invention includes a plurality of communication nodes, a communication line, a first direct current power line, a second direct current power line, and a capacitor. The communication line couples the communication nodes. The communication line is formed of a balanced line including a first communication line and a second communication line. The first direct current power line couples a first connection point of the first communication line with a positive terminal of a battery. The second direct current power line couples a second connection point of the second communication line with the positive terminal of the battery. The capacitor is coupled between the first direct current power line and the second direct current power line. The communication nodes communicate with each other by superimposing a high frequency signal having a wavelength of $\lambda$ to the communication line. The capacitor is coupled with the first direct current power line at a position where a line length from the first connection point is $(n \times \lambda/2 + \lambda/4)$, where n is a natural number including zero. The capacitor is coupled with the second direct current power line at a position where a line length from the second connection point is $(n \times \lambda/2 + \lambda/4)$.

In the power line communication system according to the fourth aspect, influence of the high frequency signal to the battery can be restricted with a simple structure.

BRIEF DESCRIPTION OF THE DRAWINGS

Additional objects and advantages of the present invention will be more readily apparent from the following detailed description of preferred embodiments when taken together with the accompanying drawings. In the drawings.

DETAILED DESCRIPTION OF THE PREFERRED EMBODIMENTS

First Embodiment

Figure 1:
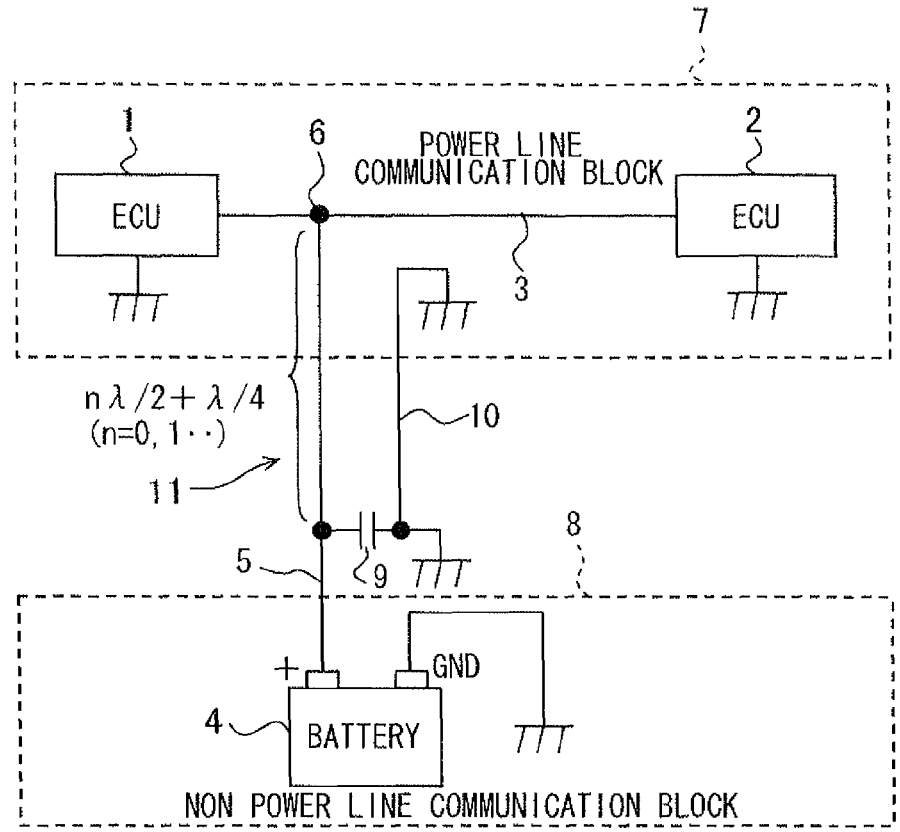
FIG. 1 is a diagram showing a power line communication system according to a first embodiment of the present invention.

A power line communication system according to a first embodiment of the present invention will be described with reference to FIG. 1 to FIG. 4B. The power line communication system can be installed, for example, in a vehicle. The power line communication system includes two electronic control units (ECU) 1 and 2, a communication line 3, a battery 4, and a power line 5. Each of the ECU 1 and the ECU 2 can operate as a communication node. The battery 4 can operate as a power source. The power line 5 can operate as a direct current power line. The ECU 1 and the ECU 2 are coupled with each other through the communication line 3. A positive terminal of the battery 4 is coupled with a connection point 6 of the communication line 3 through the power line 5. A block including the ECU 1 and the ECU 2 coupled through the communication line 3 is referred to as a power line communication block 7. A block including the battery 4 is referred to as a non power line communication block 8.

In the power line communication block 7, the ECU 1 and the ECU 2 perform two-way communication through the communication Line 3. Each of the ECU 1 and the ECU 2 is activated by being applied with a power source voltage +B (for example, 12 V) from the battery 4 through the communication line 3. Each of the ECU 1 and the ECU 2 decreases the power source voltage +B as necessary to be a voltage appropriate to an internal circuit. Communication drivers (not shown) in the ECU 1 and the ECU 2 transmit a communication signal by superimposing a high-frequency signal of, for example, about 30 MHz band to the power supplied to the communication line 3.

In the present case, it is necessary to restrict influence of communication with the high frequency signal performed in the power communication block 7 to the non power line communication block 8. Therefore, in the present embodiment, the following configuration is introduced. When the high frequency signal has a wavelength of λ, a capacitor 9 is coupled between a ground (body earth) and a point of the power line 5 located at a distance of (n×λ/2+λ/4) from the connection point 6, where n is a natural number including zero. The capacitor 9 can operate as a matching circuit. The ground is coupled with a ground in the power line communication block 7 through a ground line 10. A capacitance of the capacitor 9 is determined so that impedance is sufficiently low with respect to a frequency in 30 MHz band. The power line 5 and the ground line 10 include a matching section 11 where the line length of the power line 5 from the connection point 6 is (n×λ/2+λ/4).

In a case where a load impedance can be regarded as zero by coupling the capacitor 9, an input impedance Zin on the battery 4 side viewed from the connection point 6 can be expressed by formula (1) from the formula of a lossless transmission line.

$$Zin = j*Z0*\tan \beta L \quad (1)$$

where Z0 is a characteristic impedance, $\beta = 2\pi/\lambda$, L is a distance from the connection point 6 to the point to which the capacitor 9 is coupled.

When L=(n×λ/2+λ/4), the input impedance Zin becomes infinity (maximum) regardless of the value of n. This is an operation similar to a short stub structure. Thus, the high frequency signal having the wavelength of λ and superimposed to the communication line 3 is filtered by the operation of the short stub structure and is restricted from being transmitted to the non power line communication block 8. Each of the ECU 1 and the ECU 2 may also include a filter so that a power system is not influenced by the high frequency signal.

An experimental system used for measuring a filtering effect (passband characteristic) of the high frequency signal in the power line communication system shown in FIG. 1 will be described with reference to FIG. 2. The experimental system includes an aluminum board 12 as a body earth. The battery 4 is disposed on a left portion of the aluminum board 12. A matching circuit including the capacitor 9, the matching section 11, and a power superimposing portion including the connection point 6 are disposed on a styrene foam 13 that is disposed on a right portion of the aluminum board 12. The matching section 11 may be formed of a twisted pair cable. A coating material of the twisted pair cable has a relative permittivity of, for example, εr=2.7. When the wavelength λ of the signal having the frequency of 30 MHz is approximated to 10 m, λ/4 compensated with the relative permittivity εr can be expresses by formula (2).

$$10 \text{ m}/4/\sqrt{(2.7)} \approx 1.5 \text{ m} \quad (2)$$

where √( ) indicates the square root of the number in the parenthesis. Based on the formula (2), the length of the matching section is set to 1.5 m (n=0). In FIG. 1, the matching section 11 is shown by two parallel wires not by a twisted pair cable for convenience of clearly explaining the principle.

Figure 2:
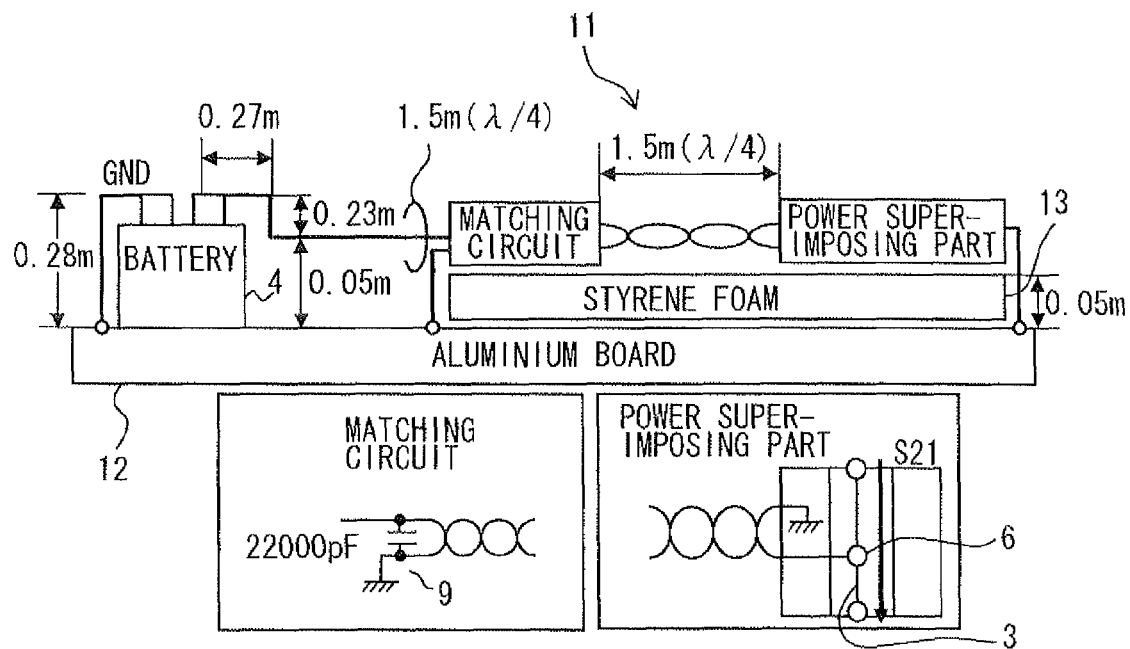
FIG. 2 is a diagram showing an experimental system according to the first embodiment.
Figure 3A:
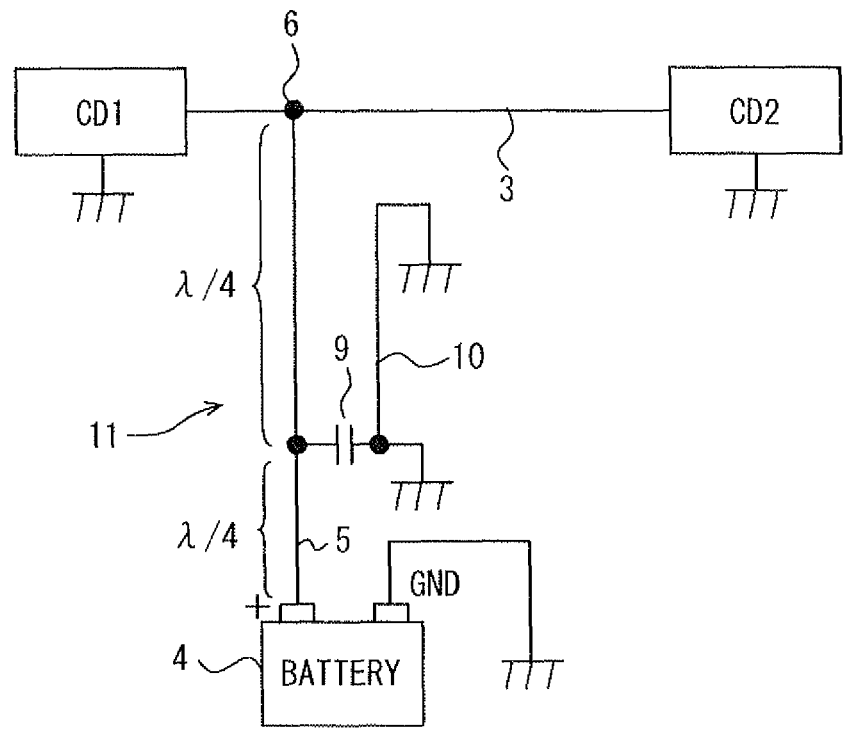
FIG. 3A is a diagram showing an example of a power line communication system using the experimental system shown in FIG. 2.

In an example shown in FIG. 3A that uses the experimental system in FIG. 2, a high frequency signal having a communication band of 30 MHz±6 MHz is transmitted from a first communication device (CD1) to a second communication device (CD2). The first communication device and the second communication device correspond to the ECU 1 and the ECU 2. In the example shown in FIG. 3A, a coil is not provided (coil less). In a comparative example shown in FIG. 3B, the power line 5 is coupled to the connection point 6 through a coil so as to form a filter.

Figure 3B:
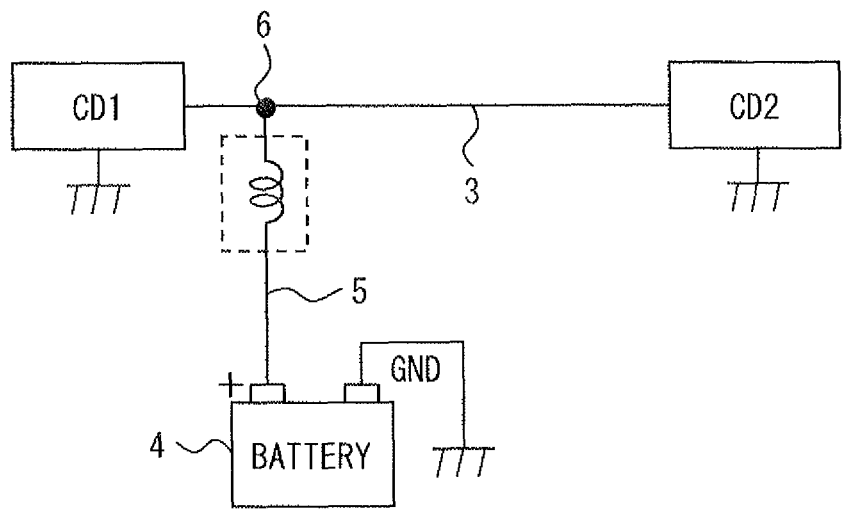
FIG. 3B is a diagram showing a comparative example of a power line communication system.
Figure 4A:
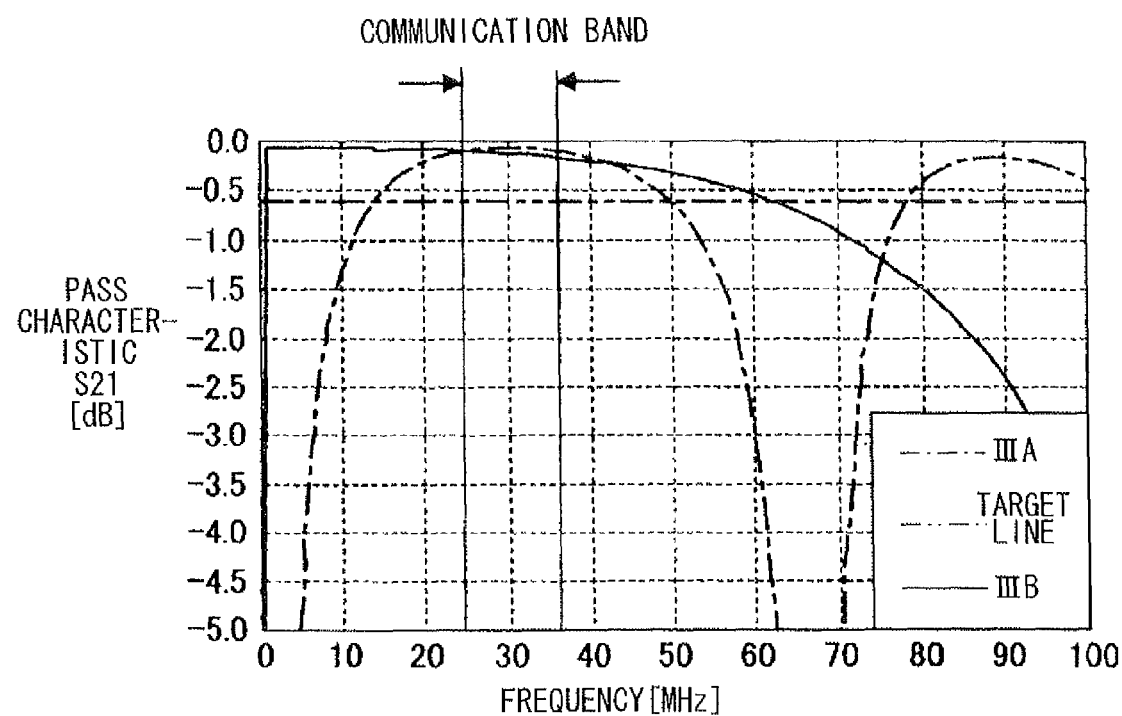
FIG. 4A is a graph showing pass characteristics S21 when a capacitance of a capacitor is 22000 pF.
Figure 4B:
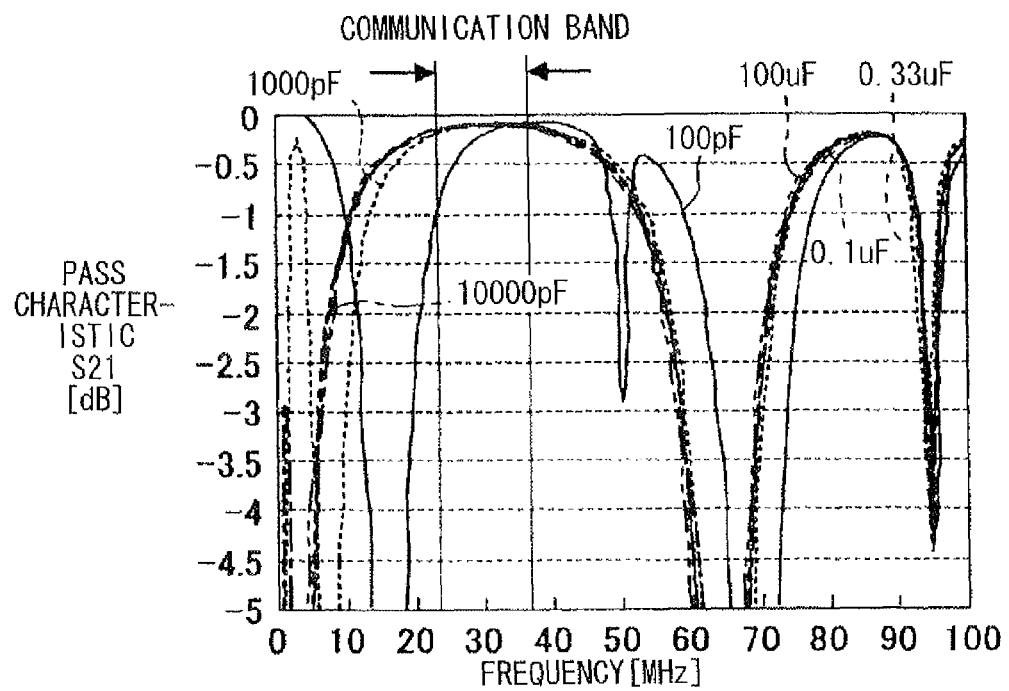
FIG. 4B is a graph showing pass characteristics S21 when the capacitance of the capacitor is changed from 100 pF to 100 μF.

When the capacitor 9 has a capacitance of 22000 pF, pass characteristic S21 between the first communication device and the second communication device becomes as show in FIG. 4A. The pass characteristic S21 of the example shown in FIG. 3A is shown by the dashed-dotted line IIIA. The pass characteristic S21 of the comparative example shown in FIG. 3B is shown by the solid line IIIB. A target line is shown by the dashed-two dotted line. Both of the example shown in FIG. 3A and the comparative example shown in FIG. 3B have pass characteristics of about −0.2 dB in the passband. Thus, communication characteristic is not affected even when a configuration according to the present embodiment is used. FIG. 4B is a graph showing pass characteristics S21 when the capacitance of the capacitor 9 is changed from 100 pF to 100 µF except for 22000 pF shown in FIG. 4A. The pass characteristics S21 in the passband are largely satisfactory except for a case where the capacitance is 100 pF, which is the minimum. When attenuation characteristics outside the passband are considered together, the case where the capacitance is 22000 pF is the best as shown in FIG. 4A.

As described above, in the power line communication system according to the present embodiment, the capacitor 9 is coupled with the power line 5, which couples the positive terminal (+) of the battery 4 with the communication line 3, at the point at a distance of $(n \times \lambda/2 + \lambda/4)$ from the connection point 6 so as to form a structure equivalent to a short stub. Thus, only by adding the capacitor 9, influence of the high frequency signal to the battery 4 can be restricted. When the matching section 11 is formed of a twisted pair cable, a distance between a pair of lines can be maintained, a high frequency characteristic can be stable, and a filter effect can be stably achieved. The matching section 11 may also be provided by two parallel wires as shown in FIG. 1. Also in this case, a distance between the power line 5 and the ground line 10 can be maintained to a fixed value, the filter effect can be stably achieved.

Second Embodiment

Figure 5:
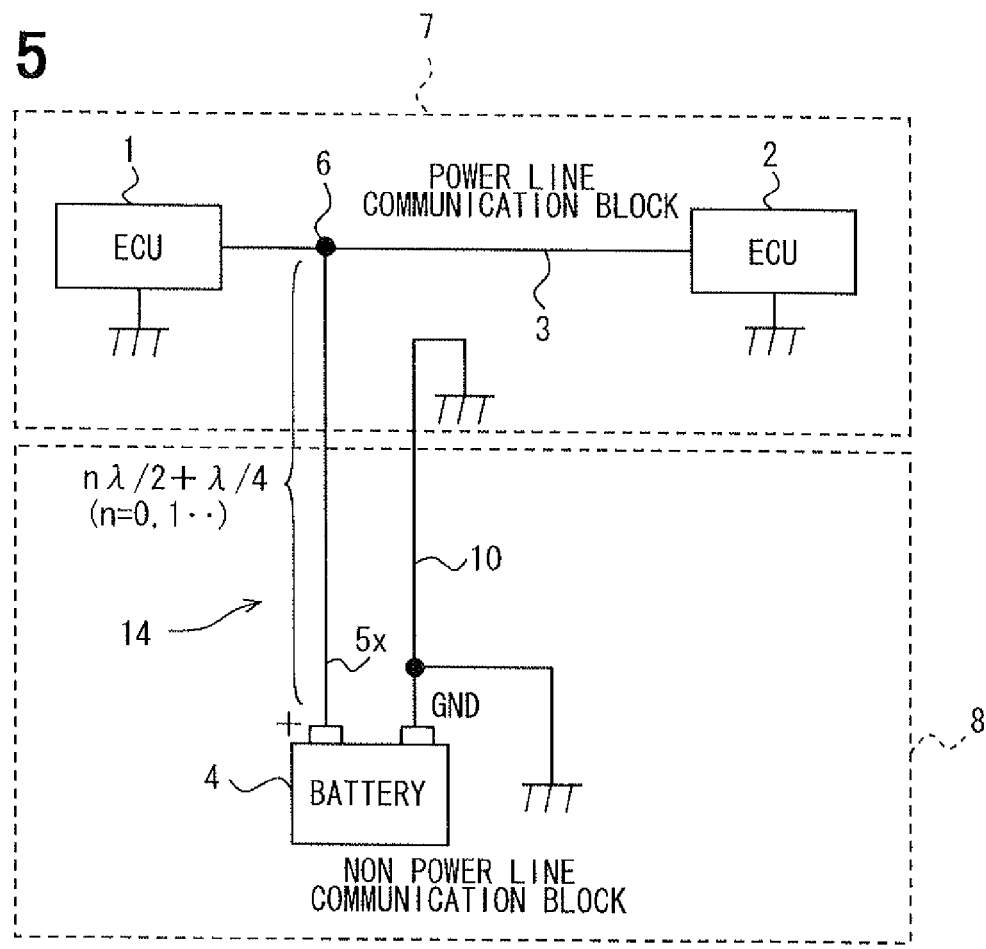
FIG. 5 is a diagram showing a power line communication system according to a second embodiment of the present invention.

A power line communication system according to a second embodiment of the present invention will be described with reference to FIG. 5 to FIG. 7. In the power line communication system according to the present embodiment, the capacitor 9 is omitted from the power line communication system according to the first embodiment, and a power line 5x is provided instead of the power line 5. The power line 5x couples the positive terminal of the battery 4 with the connection point 6 and has a line length of $(n \times \lambda/2 + \lambda/4)$. The ground line 10 directly couples the ground of the power line communication block 7 with the negative terminal (the ground of the non power line communication block 8) of the battery 4. The power line 5x and the ground line 10 form a matching section 14. When the battery 4 is directly coupled with the communication line 3 through the matching section 14, high frequency impedance on the battery 4 side viewed from the connection point 6 is sufficient low. Thus, an operation similar to a short stab structure occurs.

Figure 6:
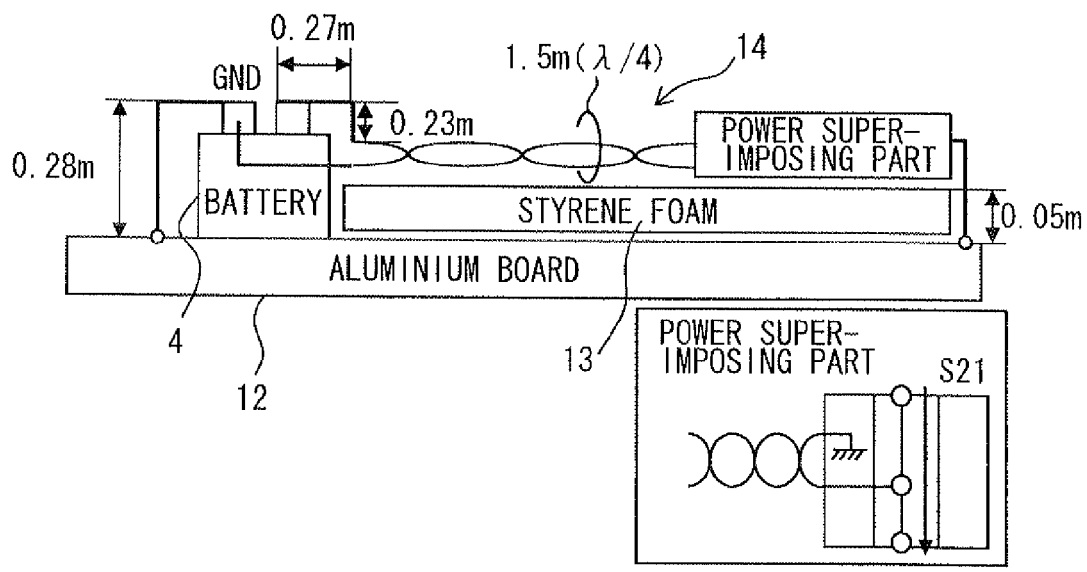
FIG. 6 is a diagram showing an experimental system according to the second embodiment.
Figure 7:
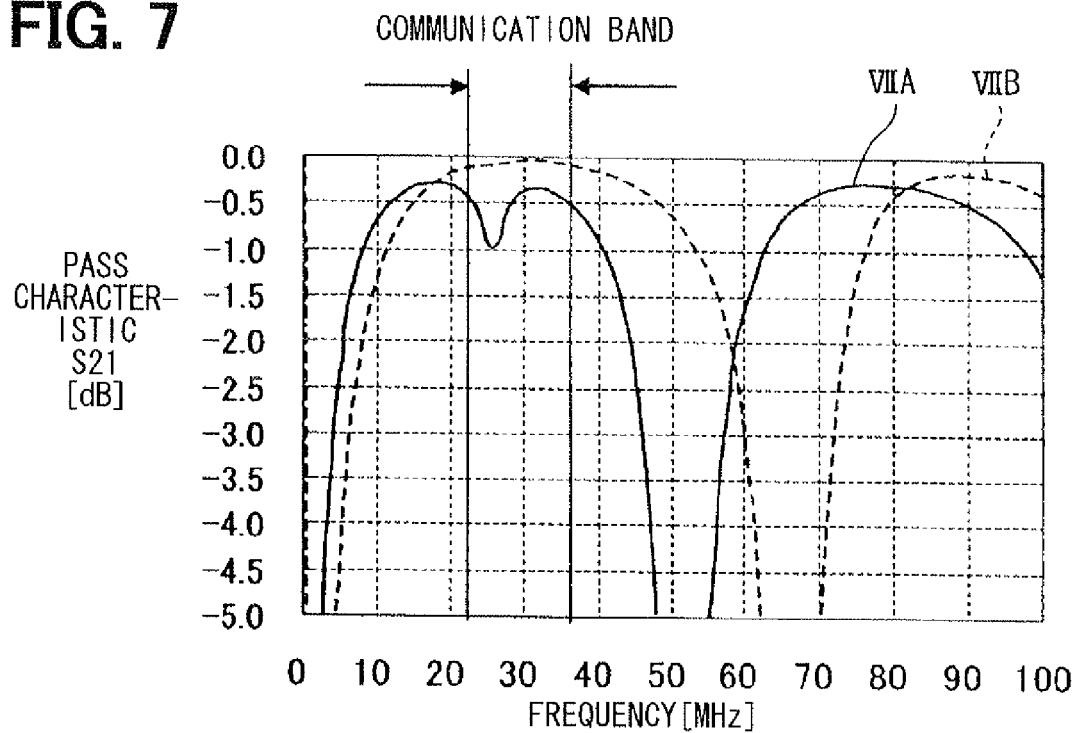
FIG. 7 is a graph showing pass characteristics S21 of the experimental system according to the first embodiment (VIIB) and the experimental system according to the second embodiment (VIIA)

In an experimental system shown in FIG. 6, the matching section 14 that directly couple a power superimposing part with the positive and negative terminals of the battery 4 is formed of a twisted pair cable in a manner similar to the first embodiment, and the length of the matching section 14 is set to be $\lambda/4 \approx 1.5$ m. In FIG. 7, a pass characteristic S21 of the experimental system according to the present embodiment is shown by the solid line IIIA, and the pass characteristic S21 of the experimental system according to the first embodiment is shown by the dashed line VIIB. In the pass characteristic S21 of the experimental system according to the present embodiment, a signal level drops to −1.0 dB within the passband. However, communication is not affected.

In the power line communication system according to the present embodiment, a structure equivalent to a short stub can be provided by setting the line length of the power line 5x coupling the positive terminal of the battery 4 with the communication line 3 to $(n \times \lambda/2 + \lambda/4)$. Thus, influence of a high frequency signal to the non power line communication block 8 can be restricted with a simple structure without adding an element for forming a filter.

Third Embodiment

Figure 8:
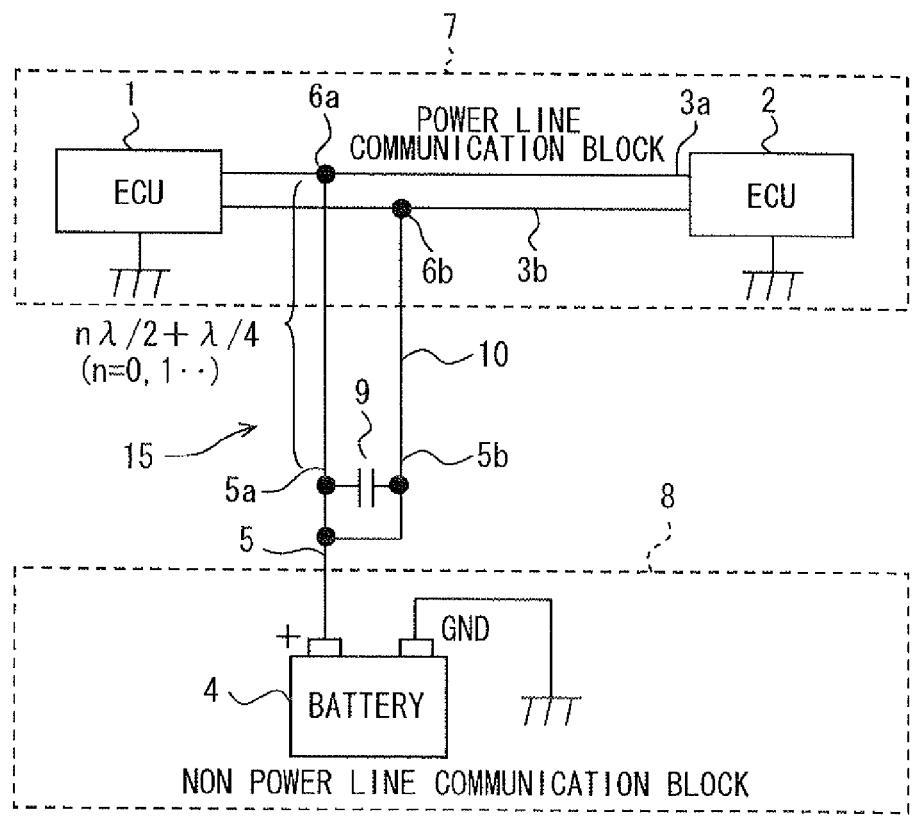
FIG. 8 is a diagram showing a power line communication system according to a third embodiment of the present invention.

A power line communication system according to a third embodiment of the present invention will be described with reference to FIG. 8. In the present embodiment, the communication line 3 is formed of a balanced line including a first communication line 3a and a second communication line 3b. The power line 5 coupled with the positive terminal of the battery 4 is diverged into a first power line 5a and a second power line 5b. The first power line 5a is coupled with a first connection point 6a of the first communication line 3a. The second power line 5b is coupled with a second connection point 6b of the second communication line 3b. A capacitor 9 is coupled between the first power line 5a and the second power line 5b. The capacitor 9 is coupled with the first power line 5a at a position where line length from the first connection point 6a is $(n \times \lambda/2 + \lambda/4)$. The capacitor 9 is coupled with the second power line 5b at a position where line length from the second connection point 6b is $(n \times \lambda/2 + \lambda/4)$. The first power line 5a and the second power line 5b include a matching section 15 where the line length of the first power line 5a from the first connection point is $(n \times \lambda/2 + \lambda/4)$ and the line length of the second power line 5b from the second connection point is $(n \times \lambda/2 + \lambda/4)$.

In the present embodiment, the communication line 3 is formed of the balanced line including the first communication line 3a and the second communication line 3b. The first power line 5a couples the positive terminal of the battery 4 with the first connection point 6a of the first communication line 3a. The second power line 5b couples the positive terminal of the battery 4 with the second connection point 6b of the second communication line 3b. The capacitor 9 is coupled between the first power line 5a and the second power line 5b at the distance of $(n \times \lambda/2 + \lambda/4)$ from the first connection point 6a and the second connection point 6b. Also in the present case, because a high frequency impedance between the first power line 5a and the second power line 5b can be reduced at connection points of the capacitor 9, effects similar to the first embodiment can be achieved.

Fourth Embodiment

Figure 9:
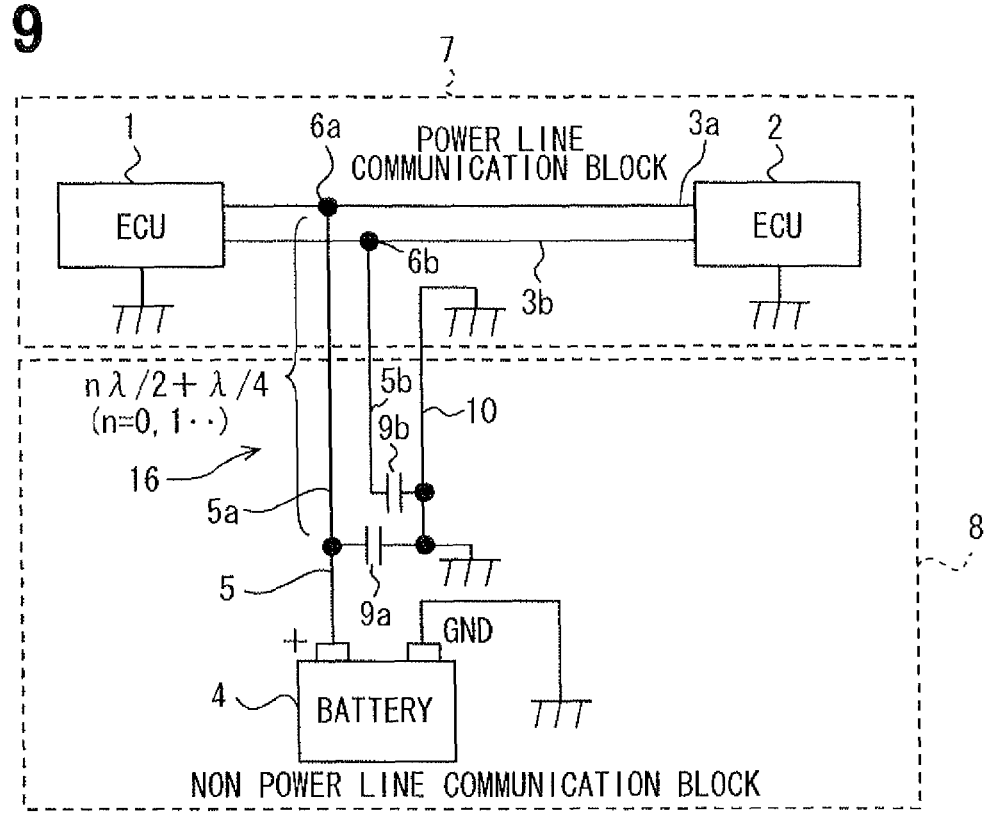
FIG. 9 is a diagram showing a power line communication system according to a fourth embodiment of the present invention.

A power line communication system according to a fourth embodiment of the present invention will be described with reference to FIG. 9. In the present embodiment, the communication line 3 is formed of a balanced line including a first communication line 3a and a second communication line 3b and the power line 5 is diverged into a first power line 5a and a second power line 5b, the first power line 5a is coupled with a first connection point 6a of the first communication line 3a and the second power line 5b is coupled with a second connection point 6b of the second communication line 3b in a manner similar to the third embodiment. Between the first power line 5a and the ground line 10, a first capacitor 9a is coupled at a position where a line length from the first connection point 6a is $(n\times\lambda/2+\lambda/4)$. Between the second power line 5b and the ground line 10, a second capacitor 9b is coupled at a position where a line length from the second connection point 6b is $(n\times\lambda/2+\lambda/4)$. The first power line 5a, the second power line 5b, and the ground line 10 include a matching section 16 where the line length of the first power line 5a from the first connection point 6a is $(n\times\lambda/2+\lambda/4)$ and the line length of the second power line 5b from the second connection point 6b is $(n\times\lambda/2+\lambda/4)$. Also in the present case, effects similar to the first embodiment can be achieved.

Fifth Embodiment

Figure 10:
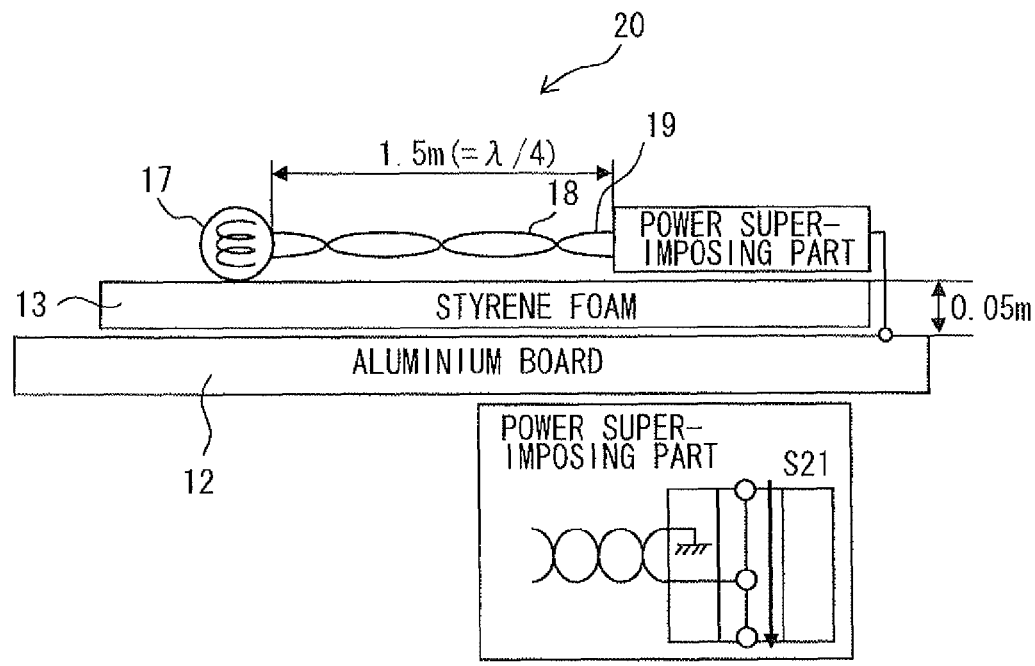
FIG. 10 is a diagram showing an experimental system according to a fifth embodiment of the present invention.
Figure 11:
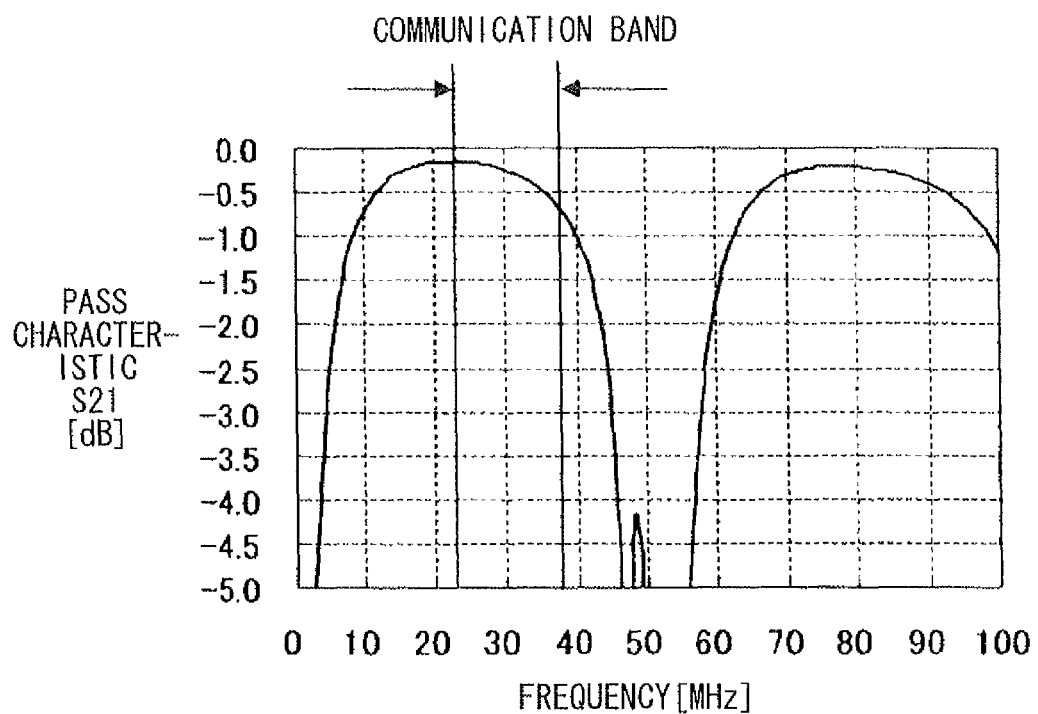
FIG. 11 is a graph showing a pass characteristic S21 of the experimental system shown in FIG. 10.

A power line communication system according to a fifth embodiment of the present invention will be described with reference to FIG. 10 and FIG. 11. In the present embodiment, a configuration similar to the second embodiment is applied to a light 17 that is a low impedance load. FIG. 10 is a diagram showing an experimental system according to the present embodiment. Power supply lines 18 and 19 coupling a power superimposing part (connection point) and the light 17 are formed of a twisted pair cable. The power supply line 18 can operate as a power line and the power supply line 19 can operate as a ground line. A filament of the light 17 is coupled with the power supply lines 18 and 19 at a position where a line length of the power supply lines 18 and 19 from the connection point is $\lambda/4\approx1.5$ m. The power supply lines 18 and 19 form a matching section 20. FIG. 11 is a graph showing a communication characteristic S21 of the experimental system in FIG. 10. A signal level at 24 MHz, which is the lower limit of the communication band, is −0.2 dB. The signal level decreases with frequency and a signal level at 36 MHz, which is the upper limit of the communication band, is −0.7 dB. However, there is no problem in communication.

In the present embodiment, the line length of the power supply lines 18 and 19 coupling the communication line 3 with the light 17 is set to be $(n\times\lambda/2+\lambda/4)$. Thus, a structure equivalent to a short stub can be formed and influence of the high frequency signal to the light 17 can be restricted with a simple structure without adding an element for forming a filter.

Sixth Embodiment

Figure 12:
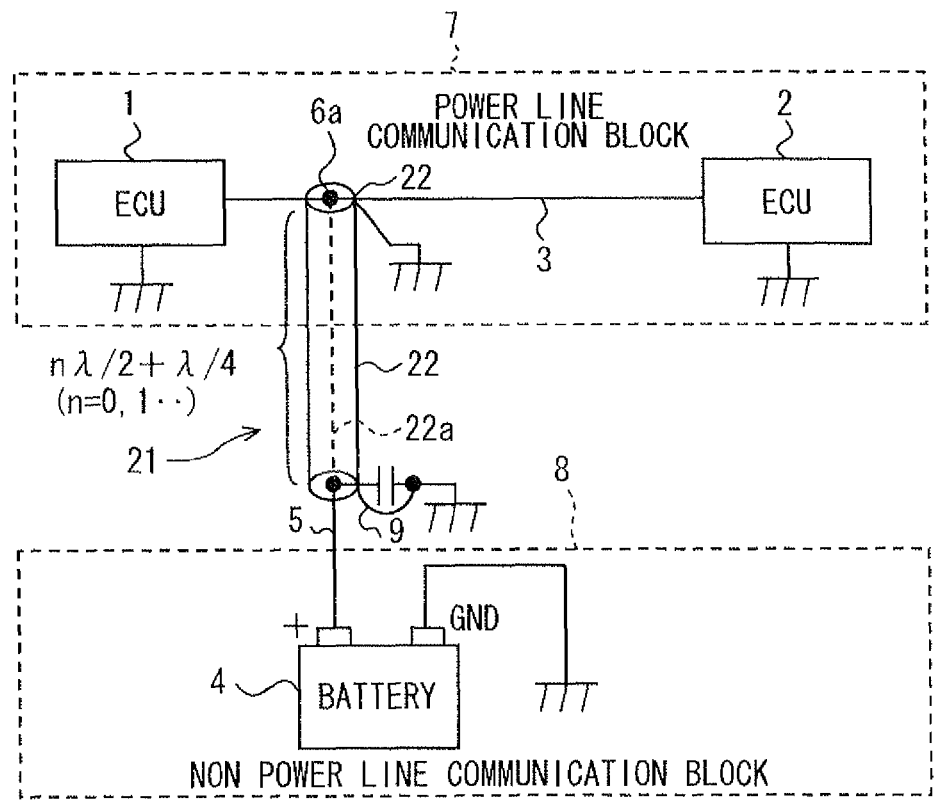
FIG. 12 is a diagram showing a power line communication system according to a sixth embodiment of the present invention.

A power line communication system according to a sixth embodiment of the present invention will be described with reference to FIG. 12. In the present embodiment, a matching section 21 is formed of a coaxial cable 22. The coaxial cable 22 includes a core wire 22a and a covered wire 22b. The core wire 22a can operate as a power line. The covered wire 22b can operate as a ground line. The core wire 22a couples the connection point 6 of the communication line 3 with the positive terminal of the battery 4 and has a line length of $(n\times\lambda/2+\lambda/4)$. One end of the covered wire 22b is coupled with the ground of the power line communication block 7, and the other end of the covered wire 22b is coupled with a ground in the vicinity of the non power line communication block 8. Also in the present case, a distance between the core wire 22a operating as the power line and the covered wire 22b operating as the ground line is fixed. Thus, a filter effect can be stably achieved.

Other Embodiments

Although the present invention has been fully described in connection with the preferred embodiments thereof with reference to the accompanying drawings, it is to be noted that various changes and modifications will become apparent to those skilled in the art.

Each of the power line communication systems according to the above-described embodiments may also include more than two communication nodes. The first embodiment may be applied to a power line for supplying power to a load. The value of n for determining the matching sections may be appropriately changed. A load having low impedance is not limited to the light 17 and may be other load. Each of the matching sections 11, 14, 15, 16, 20, and 21 in the above-described embodiments may be formed of one of a twisted cable, a coaxial cable, and parallel wires.

An application of the power line communication system according to the above-described embodiments is not limited to an in-vehicle communication and is broadly applicable to a power line communication system.

What is claimed is:

1. A power line communication system comprising:
a plurality of communication nodes;
a communication line coupling the plurality of communication nodes, the communication line formed of a balanced line including a first communication line and a second communication line;
a first direct current power line coupling a first connection point of the first communication line with a positive terminal of a battery;
a second direct current power line coupling a second connection point of the second communication line with the positive terminal of the battery;
a first capacitor coupled between the first direct current power line and a ground; and
a second capacitor coupled between the second direct current power line and the ground, wherein
the plurality of communication nodes communicates with each other by superimposing a high frequency signal having a wavelength of $\lambda$ to the communication line,
the first capacitor is coupled with the first direct current power line at a position where a line length from the first connection point is $(n\times\lambda/2+\lambda/4)$, where n is a natural number including zero, and
the second capacitor is coupled with the second direct current power line at a position where a line length from the second connection point is $(n\times\lambda/2+\lambda/4)$.

2. The power line communication system according to claim 1, further comprising a ground line coupling the first capacitor and the second capacitor with the ground, wherein
the first direct current power line, the second direct current power line, and the ground line include a section where the line length of the first direct current power line from the first connection point is $(n\times\lambda/2+\lambda/4)$ and the line length of the second direct current power line from the second connection point is $(n\times\lambda/2+\lambda/4)$, and
the section is formed of a twisted cable.

3. The power line communication system according to claim 1, further comprising a ground line coupling the first capacitor and the second capacitor with the ground, wherein
the first direct current power line, the second direct current power line, and the ground line include a section where the line length of the first direct current power line from the first connection point is $(n\times\lambda/2+\lambda/4)$ and the line length of the second direct current power line from the second connection point is $(n\times\lambda/2+\lambda/4)$, and
the section is formed of a coaxial cable.

4. The power line communication system according to claim 1, further comprising a ground line coupling the first capacitor and the second capacitor with the ground, wherein the first direct current power line, the second direct current power line, and the ground line include a section where the line length of the first direct current power line from the first connection point is $(n\times\lambda/2+\lambda/4)$ and the line length of the second direct current power line from the second connection point is $(n\times\lambda/2+\lambda/4)$, and the section is formed of parallel wires.

5. A power line communication system comprising:

a plurality of communication nodes;

a communication line coupling the plurality of communication nodes, the communication line formed of a balanced line including a first communication line and a second communication line;

a first direct current power line coupling a first connection point of the first communication line and a positive terminal of a battery;

a second direct current power line coupling a second connection point of the second communication line and the positive terminal of the battery; and a capacitor coupled between the first direct current power line and the second direct current power line, wherein the plurality of communication nodes communicates with each other by superimposing a high frequency signal having a wavelength of $\lambda$ to the communication line, the capacitor is coupled with the first direct current power line at a position where a line length from the first connection point is $(n\times\lambda/2+\lambda/4)$, where n is a natural number including zero, and the capacitor is coupled with the second direct current power line at a position where a line length from the second connection point is $(n\times\lambda/2+\lambda/4)$.

6. The power line communication system according to claim 5, wherein the first direct current power line and the second direct current power line include a section where the line length of the first direct current power line from the first connection point is $(n\times\lambda/2+\lambda/4)$ and the line length of the second direct current power line from the second connection point is $(n\times\lambda/2+\lambda/4)$, and the section is formed of a twisted pair cable.

7. The power line communication system according to claim 5, wherein the first direct current power line and the second direct current power line include a section where the line length of the first direct current power line from the first connection point is $(n\times\lambda/2+\lambda/4)$ and the line length of the second direct current power line from the second connection point is $(n\times\lambda/2+\lambda/4)$, and the section is formed of a coaxial cable.

8. The power line communication system according to claim 5, wherein the first direct current power line and the second direct current power line include a section where the line length of the first direct current power line from the first connection point is $(n\times\lambda/2+\lambda/4)$ and the line length of the second direct current power line from the second connection point is $(n\times\lambda/2+\lambda/4)$, and the section is formed of two parallel wires.

* * * * *